United States Patent
Kiick

(10) Patent No.: US 7,028,302 B2
(45) Date of Patent: Apr. 11, 2006

(54) SYSTEM AND METHOD FOR AUTOMATICALLY TUNING A MULTIPROCESSOR COMPUTER SYSTEM

(75) Inventor: Chris J. Kiick, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 10/131,669

(22) Filed: Apr. 24, 2002

(65) Prior Publication Data

US 2003/0200250 A1    Oct. 23, 2003

(51) Int. Cl.
*G06F 9/46* (2006.01)
(52) U.S. Cl. .................. 718/105; 718/100; 718/102; 718/107
(58) Field of Classification Search ............. 718/105, 718/107, 102, 100; 710/110, 116, 113, 260, 710/266
See application file for complete search history.

(56) References Cited

U.S. PATENT DOCUMENTS

| | | | | |
|---|---|---|---|---|
| 5,282,272 A | * | 1/1994 | Guy et al. | 710/116 |
| 5,517,626 A | * | 5/1996 | Archer et al. | 710/110 |
| 5,894,578 A | * | 4/1999 | Qureshi et al. | 710/266 |
| 5,944,809 A | * | 8/1999 | Olarig et al. | 710/260 |
| 6,041,377 A | * | 3/2000 | Mayer et al. | 710/113 |
| 6,237,058 B1 | * | 5/2001 | Nakagawa | 710/260 |
| 6,249,830 B1 | * | 6/2001 | Mayer et al. | 710/113 |
| 6,260,068 B1 | | 7/2001 | Zalewski et al. | 709/226 |
| 6,845,417 B1 | * | 1/2005 | Kauffman et al. | 710/116 |
| 6,877,057 B1 | * | 4/2005 | Alexander et al. | 710/263 |

OTHER PUBLICATIONS

"82093AA I/O Advanced Programmable Interrupt Controller (IOAPIC)"; May 1996; pp. 1-20; Intel.
"MultiProcessor Specification" Version 1.4; May 1997; 90 pages; Intel.

* cited by examiner

*Primary Examiner*—Majid A. Banankhah

(57) ABSTRACT

A system and method for automatically tuning a multiprocessor (MP) computer system having a set of processors, associated memory resources, interrupt sources and interrupt service routines (ISRs). Upon initialization of the MP system, the ISRs are assigned to the processors in a particular fashion. Thereafter, runtime statistics associated with the execution of the ISRs by the processors are monitored periodically. Where there is an imbalance with respect to a condition relating to the runtime statistics, the ISRs are dynamically re-assigned to the processors based on the runtime statistics in accordance with an optimization technique.

31 Claims, 4 Drawing Sheets

SYSTEM AND METHOD FOR AUTOMATICALLY TUNING A MULTIPROCESSOR COMPUTER SYSTEM

BACKGROUND OF THE INVENTION

1. Technical Field of the Invention

The present invention generally relates to multiprocessor computer systems. More particularly, and not by way of any limitation, the present invention is directed to a system and method for automatically tuning a multiprocessor (MP) computer system in order to increase its performance.

2. Description of Related Art

Conventionally, a multiprocessing system is a computer system that has more than one processor, and that is typically designed for high-end workstations or file server usage. Such a system may include a high-performance bus, huge quantities of error-correcting memory, redundant array of inexpensive disk (RAID) drive systems, advanced system architectures that reduce bottlenecks, and redundant features such as multiple power supplies.

In the most general sense, multiprocessing may be defined as the use of multiple processors to perform computing tasks. The term could apply to a set of networked computers in different locations, or to a single system containing several processors. As is well known, however, the term is most often used to describe an architecture where two or more linked processors are contained in a single or partitioned enclosure. Further, multiprocessing does not occur just because multiple processors are present. For example, having a stack of personal computers in a rack is not multiprocessing. Similarly, a server with one or more "standby" processors is not multiprocessing, either. The term "multiprocessing" is typically applied, therefore, only to architectures where two or more processors are designed to work in a cooperative fashion on a task or set of tasks.

There exist numerous variations on the basic theme of multiprocessing. In general, these variations relate to how independently the processors operate and how the workload among these processors is distributed. In loosely-coupled multiprocessing architectures, the processors perform related tasks but they do so as if they were standalone processors. Each processor is typically provided with its own private memory and may have its own mass storage and input/output (I/O). Further, each loosely-coupled processor runs its own copy of an operating system (OS), and communicates with the other processor or processors through a message-passing scheme, much like devices communicating over a local area network. Loosely-coupled multiprocessing has been widely used in mainframes and minicomputers, but the processing software's architecture is closely tied to the hardware design. For this reason, among others, it has not gained the support of software vendors and is not widely used in today's high performance server systems.

In tightly-coupled multiprocessing, on the other hand, operation of the processors is more closely integrated. They typically share main memory, and may even have a shared cache. The processors need not be identical to one another, and may or may not perform similar tasks. However, they typically share other system resources such as mass storage and I/O. Additionally, instead of a separate copy of the OS for each processor, they run a single copy, with the OS handling the coordination of tasks between the processors. The sharing of system resources makes tightly-coupled multiprocessing platforms somewhat less expensive, and it is the dominant multiprocessor architecture in the business-class servers currently deployed.

Hardware architectures for tightly-coupled MP platforms can be further divided into two broad categories. In symmetrical MP (SMP) systems, system resources such as memory, disk storage and I/O are shared by all the microprocessors in the system. The workload is distributed evenly to available processors so that one does not sit idle while another is heavily loaded with a specific task. Further, the SMP architecture is highly scalable, i.e., the performance of SMP systems increases, at least theoretically, as more processor units are added.

In asymmetrical MP (AMP) systems, tasks and resources are managed by different processor units. For example, one processor unit may handle I/O and another may handle network OS (NOS)-related tasks. Thus, it should be apparent that an asymmetrical MP system may not balance the workload and, accordingly, it is possible that a processor unit handling one task can be overworked while another unit sits idle.

SMP systems are further subdivided into two types, depending on the way cache memory is implemented. "Shared-cache" platforms, where off-chip (i.e., Level 2, or L2) cache is shared among the processors, offer lower performance in general. In "dedicated-cache" systems, every processor unit is provided with a dedicated L2 cache, in addition to its on-chip (Level 1, or L1) cache memory. The dedicated L2 cache arrangement accelerates processor-memory interactions in the multiprocessing environment and, moreover, facilitates higher scalability.

Regardless of the various architectural variations discussed in the foregoing, the performance of an MP computer system is significantly dependent on how the various processors are loaded with respect to servicing the I/O devices associated with the system. As is well known, the processors service the I/O devices by executing the interrupt service routines (ISRs) corresponding to the devices. Accordingly, how the ISRs are distributed among the processors impacts the overall system performance.

Typically, there are more I/O devices than processors in an MP system. As a consequence, the I/O interrupts (and the ISRs associated therewith) need to be assigned in some manner to various processors in order that they get serviced. Currently, only static assignment methods are available where the assignment is made at boot time and is not altered thereafter in any significant fashion. However, a static assignment method cannot handle the addition and deletion of I/O devices and their corresponding ISRs in an optimal manner. Moreover, even if the initial assignment of interrupts is done in accordance with a technique that guarantees optimal performance, the overall performance will eventually degrade for a number of reasons. First, each type of device has a different interrupt frequency profile which cannot be ascertained beforehand but is necessary in order to optimize the performance. A gigabit Ethernet card, for example, is likely to generate far more interrupts per second than a serial port. Even devices that are very similar, from the OS kernel's perspective, can have different performance requirements. For instance, devices such as Small Computer System Interface (SCSI) cards can have different data rates. Accordingly, the kernel, and even the device drivers, cannot have enough information at boot time about how much traffic a device will generate in order to optimally assign the interrupts to processors.

In addition, a static assignment technique will become sub-optimal because the interrupt loads will vary over time. An interrupt distribution that is optimal for network traffic may be very poor for doing media backup operations, or when the system switches modes from transaction processing to batch processing. Moreover, the hardware and system topology itself can also change. With various high availability (HA) features and hot-pluggable processors and I/O devices being required of today's MP systems, the interrupt profiles will constantly change.

SUMMARY OF THE INVENTION

Accordingly, the present invention advantageously provides a system and method for automatically tuning a multiprocessor (MP) computer system whereby balanced interrupt load balancing is achieved for increased performance. In one exemplary configuration, the MP computer system includes a set of processors, associated memory resources, interrupt sources, e.g., I/O devices, and interrupt service routines (ISRs) corresponding thereto. Upon initialization of the MP system, the ISRs are assigned to the processors in a particular fashion. In an exemplary embodiment of the present invention, the ISRs may be assigned using a round robin algorithm. Thereafter, runtime statistics associated with the execution of the ISRs by the processors are monitored periodically. Where there is an imbalance with respect to a condition relating to the runtime statistics, the ISRs are dynamically re-assigned to the processors in the system based on the runtime statistics.

In one exemplary implementation, for each ISR assigned to a processor, the total cycles spent on the ISR is maintained by means of one or more counters associated with the processor. Interrupt migration is used to move the ISRs from one processor to another based on the cycle statistics. Further, load balancing can also be done explicitly, as when a processor is activated or de-activated, or when an ISR is added or removed.

In another aspect, the present invention is directed to an MP computer system having a dynamic interrupt distributor for automatically and selectively moving the assigned ISRs to a set of processors for tuning the computer system's performance. The MP computer system may be comprised of a symmetrical MP system, asymmetrical MP system, tightly-coupled system, or a loosely-coupled system, etc.

In a further aspect, the present invention is directed to a computer program product, e.g., a computer usable medium having computer readable program code thereon, for dynamically configuring interrupts in an MP computer system wherein a plurality of ISRs can be selectively re-distributed in order to maximize the performance. The computer program product comprises operating system code (for example, a Unix-based operating system) for creating an operating system instance executable on a set of processors in the MP system. Program code is provided that is operable to assign the ISRs, upon initialization of the MP computer system, to a set of processors in a particular fashion. Also included is program code for dynamically re-distributing the ISRs among the processors upon determining that cycle times associated with executing the ISRs by the processors are imbalanced. Preferably, the program code for dynamically re-distributing the ISRs is operable responsive to software engineering techniques such as optimization algorithms. In one implementation, the ISRs may be re-distributed in a select interrupt distribution pattern that is determined in accordance with any known or heretofore unknown optimization techniques.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
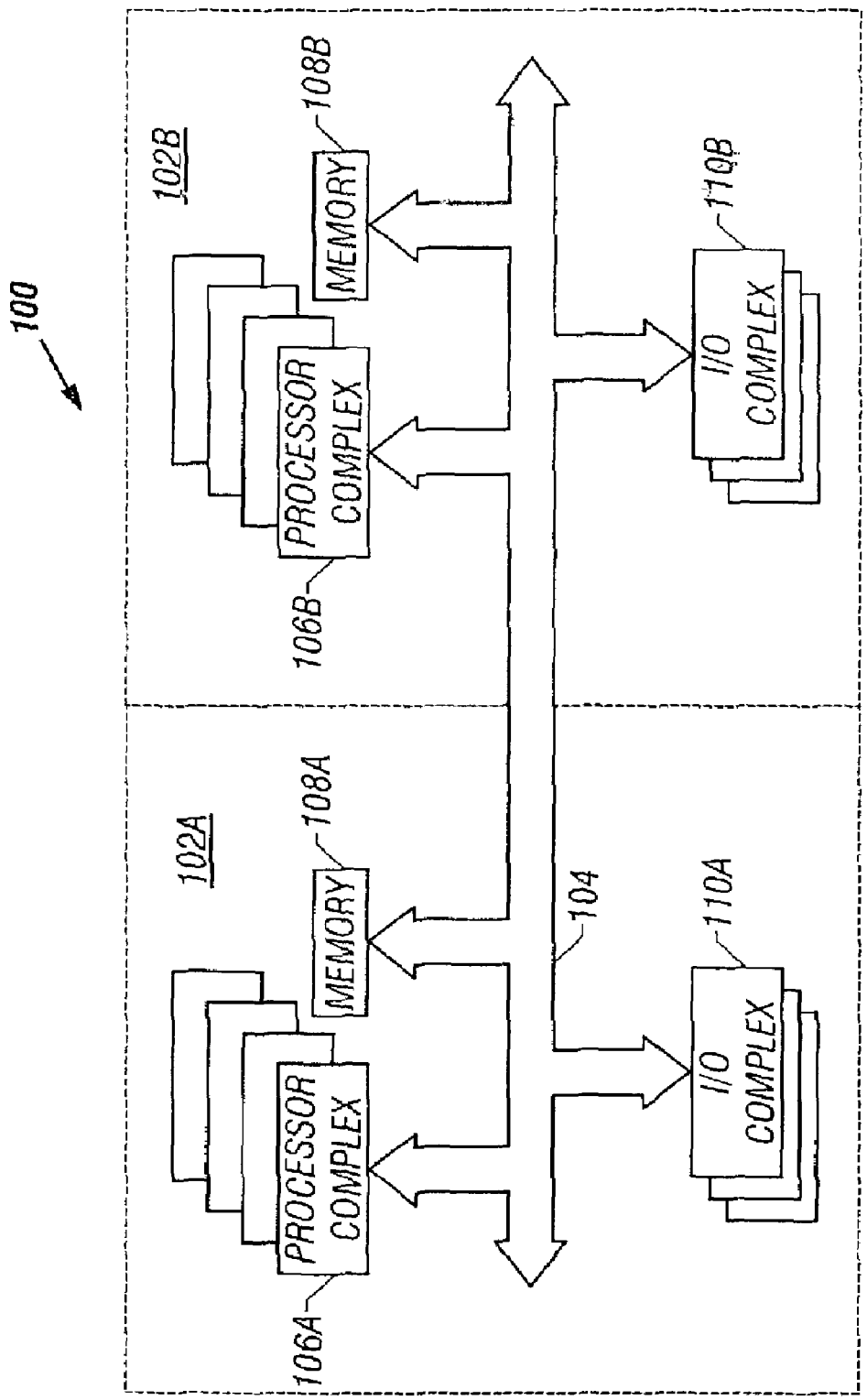
FIG. 1 depicts an exemplary multiprocessor computer system wherein the teachings of the present invention may be advantageously practiced.

In the drawings, like or similar elements are designated with identical reference numerals throughout the several views thereof, and the various elements depicted are not necessarily drawn to scale. Referring now to FIG. 1, depicted therein is an exemplary multiprocessor (MP) computer system 100 wherein the teachings of the present invention may be advantageously practiced for increasing performance by implementing a dynamic interrupt migration scheme in accordance herewith. The MP computer system 100 may preferably be comprised of a symmetrical MP system that is partitionable in accordance with known or heretofore unknown virtual partitioning schemes. In another exemplary embodiment, the computer system 100 may comprise a plurality of hardware-based architectural partitions. In further embodiments, a multicellular computer system or a multi-nodal computer system may form the exemplary MP computer system 100. Accordingly, it is useful to conceptualize the MP computer system 100 as having a plurality of defined domains, where the domains may be cells, virtual or real partitions, nodes, and the like. In FIG. 1, reference numerals 102A and 102B refer to two domains of the MP computer system 100. Each domain includes a processor complex (reference numerals 106A and 106B) comprising a plurality of processors (e.g., four processors) operable to run an instance of a select operating system (OS). For example, the OS may comprise a Unix-based product such as HP-UX®, Solaris®, AIX®, Ultrix®, etc. Further, each domain also includes domain-specific memory (reference numerals 108A and 108B) and domain-specific interrupt sources such as, e.g., I/O complex 110A and I/O complex 110B. An MP-capable bus 104 is provided to interconnect the various hardware resources of the domains of the MP computer system 100 in any architectural variation alluded to hereinabove. It should be appreciated that other hardware details such as, e.g., shared main memory, shared I/O, etc., are not shown in FIG. 1 for the sake of simplification.

Figure 2:
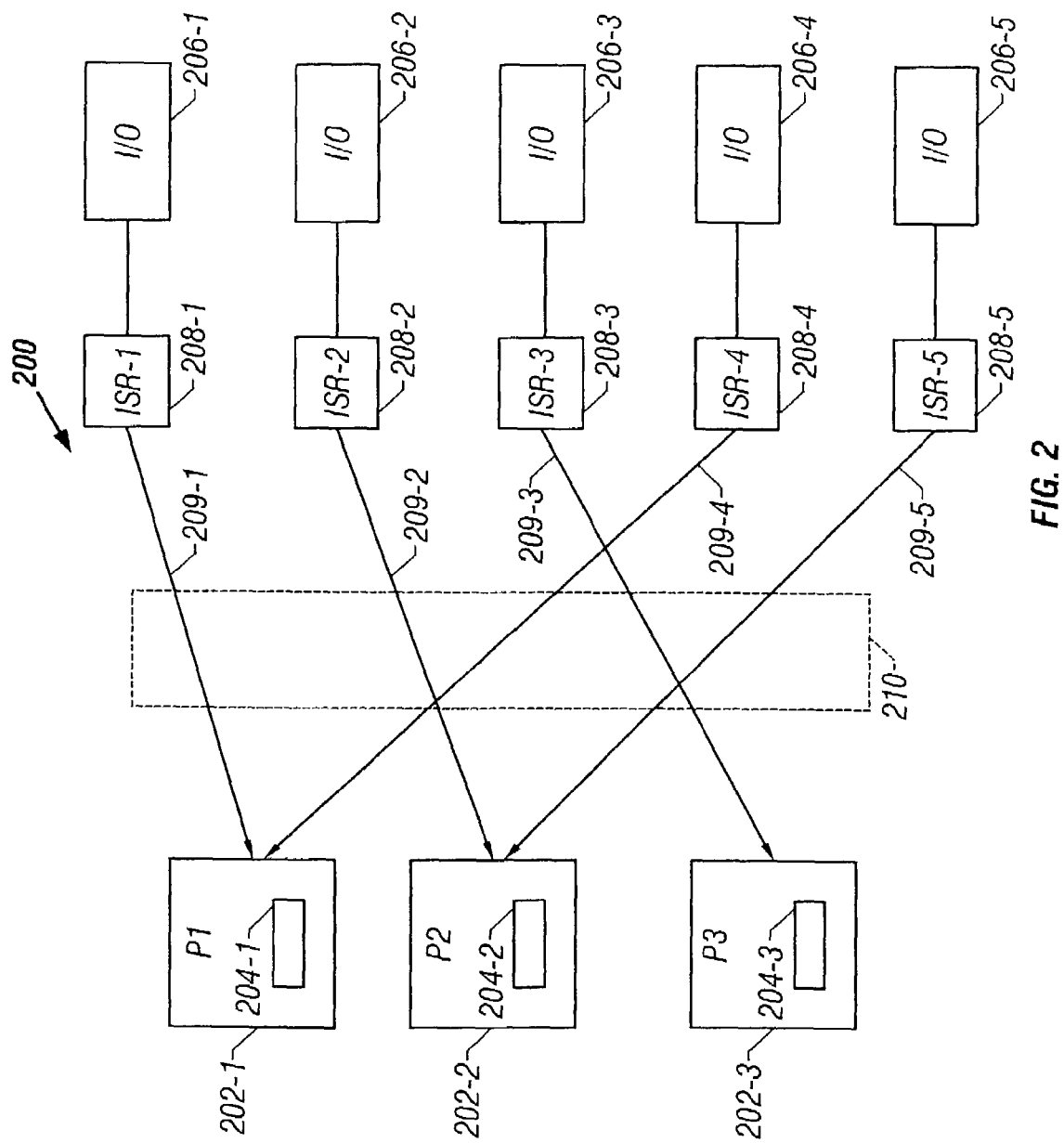
FIG. 2 depicts an exemplary embodiment of the dynamic interrupt distribution scheme in accordance with the teachings of the present invention.

FIG. 2 depicts an exemplary embodiment of the dynamic interrupt distribution scheme 200 in accordance with the teachings of the present invention. Three processors (P1-P3), reference numerals 202-1 through 202-3, exemplify a defined domain of an MP computer system such as, for instance, the computer system 100 described above. A plurality of I/O devices, for example five I/O devices having reference numerals 206-1 through 206-5, operate as domain-specific interrupt sources requiring processing by the processors of the domain. As pointed out earlier, processing of each I/O interrupt is facilitated by means of an interrupt service routine (ISR) that is assignable to a specific processor. However, as set forth in the Background section of the present patent application, the existing ISR assignment methods are static only (made at boot time), with the attendant shortcomings and deficiencies.

In accordance with the teachings of the present invention, dynamic interrupt migration is implemented for re-distributing the ISRs on the fly (i.e., while the MP computer system is up and running) as and when the processor loading of the ISRs becomes sub-optimal. In other words, when the processors of the domain exhibit uneven runtime statistics in executing the assigned ISRs, the present invention dynamically re-assigns the ISRs in accordance with a select interrupt distribution pattern so as to optimize the processor performance.

Upon initialization of the computer system, the ISRs 208-1 through 208-5 are assigned to the domain processors P1–P3 in accordance with any known or heretofore unknown initial assignment method activated during boot-up. In one exemplary embodiment, an equal number of ISRs may be initially assigned to each of the processors. In a further exemplary embodiment, the initial ISR assignment may be made in a round robin fashion, for instance. Accordingly, TSR 208-1 is initially assigned to P1 202-1, ISR 208-1 to P2 202-2, ISR 208-3 to P3 202-3, ISR 208-4 to P1 202-1 again, and finally, ISR 208-5 to P2 202-2 also. These round robin assignments are illustrated as directed paths 209-1 through 209-5 in FIG. 2.

Each processor is associated with an ISR runtime monitor, e.g., one or more counters, for monitoring the runtime statistics associated with the ISR or ISRs assigned to that processor. Reference numerals 204-1 through 204-3 refer to the three monitors provided with P1–P3 processors, respectively. Preferably, each monitor is operable to gather ISR data such as the number of processor cycles utilized per unit time per ISR, cycle time percentage distributions, et cetera. Also, the data can be gathered on the fly, as interrupts are generated by the I/O devices in the defined domain. In an exemplary embodiment of the present invention, a counter-based data structure system may be implemented (which may be per-processor or per-ISR) for holding the data, with one slot for each device. When an interrupt occurs, the interrupt handling code can increment the corresponding counter, and save the clock cycle counter. On return from the interrupt, the interrupt handling code can quickly compute the cycles spent in executing the ISR and save that data as well. Those skilled in the art should readily appreciate that these computations take only a few instructions and, accordingly, no significant overhead is added to an interrupt handler.

Continuing to refer to FIG. 2, a dynamic interrupt distributor 210 is provided as part of the interrupt migration scheme 200 for periodically taking a "snap shot" of the ISR statistics to determine whether the loading among the processors is out of balance based on a performance condition relating to the statistics. In an exemplary implementation, the dynamic interrupt distributor 210 may be embodied as a program module (e.g., program code software provided as part of the kernel) that is executed every few seconds or so. A predetermined processor of the domain may be dedicated to run this module. Or, the task of executing the distributor module may be rotated among the processors as a further variation. Regardless of where it is executed, however, the distributor 210 is operable to examine the ISR runtime monitors associated with the processors. Specifically, the distributor 210 analyzes the amount of time each processor has spent on each of the ISRs assigned to it in a predetermined time slot. If there is a large enough difference between the lowest and highest usage, the distributor 210 attempts to balance the load by re-assigning the ISRs (i.e., by migrating one or more interrupts) to the processors. Accordingly, one or several processors' ISR assignment may be affected as a result.

Preferably, the dynamic interrupt distributor 210 is operable to determine an optimal interrupt distribution based on any known or heretofore unknown optimization technique or algorithm. It is desirable, however, that the selected technique be efficient, i.e., not take an inordinate amount of time to run. Also, it should not only minimize the number of interrupts for migrating but also avoid "thrashing", that is, moving interrupts back and forth because of spiky loads. The algorithm could be based on any of the known dynamic programming methods for solving the well known knapsack problem, or it could be based on similar techniques used for task load balancing in MP systems, such as a Greedy algorithm, best fit first threshold algorithm, etc.

Figure 3:
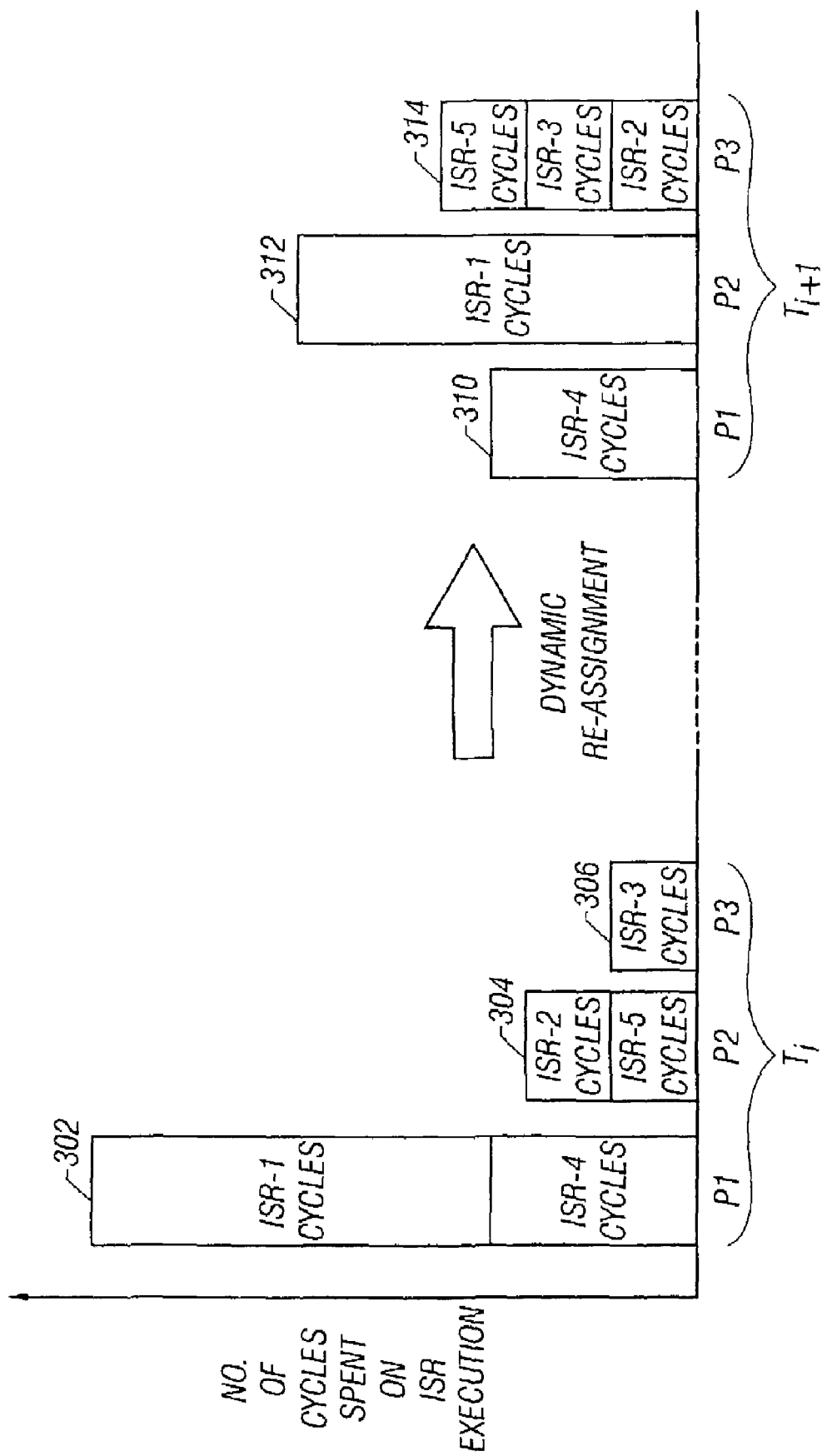
FIG. 3 is a diagrammatic representation of exemplary TSR runtime statistics in accordance with the operation of the dynamic interrupt distribution scheme of the present invention for automatically tuning a multiprocessor computer system.

Referring now to FIG. 3, shown therein is a diagrammatic representation of exemplary ISR runtime statistics in accordance with the operation of the dynamic interrupt distribution scheme of the present invention for automatically tuning an MP computer system, e.g., a system having the 3-processor domain illustrated hereinabove. As pointed out earlier, the monitor system associated with each of the processors P1–P3 collects and maintains the cycle data on per-ISR basis for a predetermined time slot. Reference numeral 302 refers to the total number of P1 cycles spent on ISR-1 and ISR-4 during $T_i$. Similarly, reference numeral 304 refers to the total number of P2 cycles spent on ISR-2 and ISR-5 during the same time period. Finally, reference numeral 306 refers to the number of P3 cycles spent on ISR-3. After determining that the processors' ISR load is out of balance, the dynamic interrupt distributor migrates the interrupts to even out the load, as illustrated by the cycle distribution obtained during $T_{i+1}$. In this example, P1 is tasked with ISR-4 only, whereas ISR-1 is migrated to P2. The remaining ISRs (ISR-2, ISR-3 and ISR-5) are re-assigned to P3. Reference numerals 310, 312 and 314 refer to the new cycle distributions of P1–P3, respectively.

Figure 4:
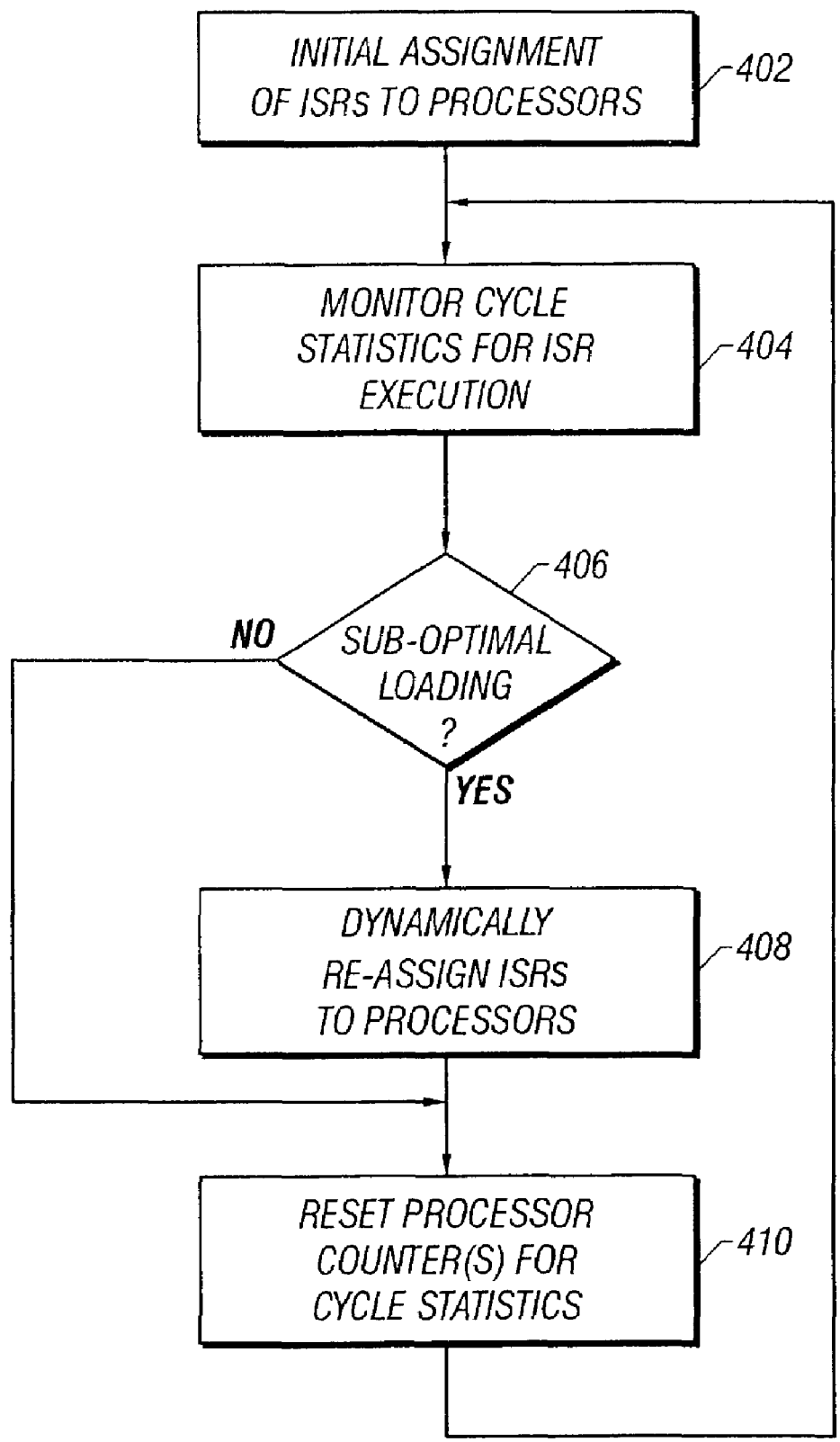
FIG. 4 is a flow chart of the various steps involved in an exemplary method for automatically tuning a multiprocessor computer system in accordance with the teachings of the present invention.

The flow chart of FIG. 4 captures the various steps involved in an exemplary embodiment of the present invention's method for automatically tuning a multiprocessor computer system. Upon initial assignment of the ISRs to a plurality of processors forming a defined domain (step 402), runtime cycle statistics are monitored on a per-processor, per-ISR basis (step 404). At predetermined periodic intervals, the dynamic interrupt distributor module of the present invention determines if the ISR loading is sub-optimal (decision block 406). If so, the ISRs are re-assigned to the processors based on a select distribution technique (step 408). If there was no imbalanced distribution of ISR statistics, no interrupt migration would take place. Regardless of whether the ISRs have been re-assigned, the monitors associated with monitoring processor cycles spent on the ISRs are reset for the next time slot (step 410).

Based upon the foregoing Detailed Description, it should be readily apparent that the present invention provides a simple yet effective automatic tuning system and method for increasing the performance of MP systems by dynamically optimizing interrupt loading. Moreover, those skilled in the art should appreciate that the dynamic interrupt distribution system greatly facilitates the addition and/or deletion of processors in the domain. When a new processor is added, its interrupt usage will be zero initially. The interrupt distributor can be called as soon as the processor is initialized, and it will re-distribute the interrupts to the new processor in order to achieve an even distribution. When a processor is to be removed, its interrupt usage can be set to infinity, and the interrupt distributor will move all of the interrupts to the remaining processors.

Because the ISR runtime data is monitored and maintained on per-CPU basis, no expensive processor locking is needed. However, several implications emerge with respect to the design of any interrupt migration code for practicing the teachings of the present invention. First, interrupt migration should be fast, so that there is only a minimal impact on the performance of an I/O device due to moving the interrupt associated therewith. Also, in the interest of maximizing availability, the interrupt migration process must be capable of being effectuated without taking the devices or drivers off-line. Further, the process should be robust enough to ensure that no interrupts are lost or go without service during the transition.

To maximize the usefulness, it is necessary that the dynamic interrupt distributor be aware of the MP system architecture. Ideally, the interrupts need to be re-assigned to the "closest" processors, typically within a defined domain. In other words, it is preferred that the interrupts are not assigned across node or cell boundaries. Moreover, L the dynamic distribution scheme should be compliant with the requirements of Real-Time Scheduling on MP systems, while being capable of deactivation on single-processor systems.

Further, it should be appreciated that an optimal interrupt distribution, dynamically determined on a periodic basis in accordance with the teachings of the present invention, ensures maximum response time to I/O events by facilitating maximum parallel processing of interrupt handlers. As a consequence, more interrupts can be handled at any one time, thereby increasing the I/O bandwidth. Optimal distribution also improves predictability, since the application performance will not vary as much across the processors. This feature is particularly significant for quality of service and high-priority task scheduling.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while the teachings of the present invention can be particularly exemplified within the context of SMP systems, those skilled in the art should recognize that the present invention can be practiced in conjunction with other hardware platforms including, for example, asymmetrical MP systems, loosely-coupled MP architectures, shared- or dedicated-cache systems, and other high-performance computing machines. Also, several implementational variations can be had with respect to the cycle time monitors associated with obtaining runtime statistics. Furthermore, as alluded to in the foregoing Detailed Description, the program code to execute the dynamic interrupt distribution scheme in accordance with the teachings of the present invention may be comprised of any type of software, firmware, or a combination thereof, and may be bundled with an OS. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method of automatically tuning a multiprocessor (MP) computer system operable to service a plurality of interrupt service routines (ISRs), said method comprising:
   upon initialization of said MP computer system, assigning said ISRs to a plurality of processors disposed in said MP computer system;
   monitoring runtime statistics associated with executing said ISRs assigned to said processors; and
   upon determining that said processors are imbalanced with respect to a condition relating to said runtime statistics, re-assigning said ISRs to at least a portion of said processors based on dynamically computing a new interrupt distribution pattern.

2. The method of automatically tuning an MP computer system as set forth in claim 1, wherein said monitoring is performed by each processor.

3. The method of automatically tuning an MP computer system as set forth in claim 1, further comprising resetting, in each processor, a counter system upon re-assigning said ISRs in accordance with a select interrupt distribution pattern.

4. The method of automatically tuning an MP computer system as set forth in claim 3, wherein said select interrupt distribution pattern is determined by an optimization algorithm.

5. The method of automatically tuning an MP computer system as set forth in claim 1, wherein said monitoring includes measuring the number of cycles each processor spends on each ISR assigned to it in a predetermined time period.

6. The method of automatically tuning an MP computer system as set forth in claim 1, further comprising resetting, in each processor, a counter system upon determining that said processors are in substantial balance with respect to said condition, said counter system for monitoring said runtime statistics.

7. The method of automatically tuning an MP computer system as set forth in claim 1, wherein said ISRs are initially assigned to said processors in a round robin fashion.

8. The method of automatically tuning an MP computer system as set forth in claim 1, wherein said ISRs are dynamically re-assigned to a set of processors within a defined partition of said MP computer system.

9. The method of automatically tuning an MP computer system as set forth in claim 8, wherein said defined partition comprises a virtual partition.

10. The method of automatically tuning an MP computer system as set forth in claim 1, wherein said ISRs are dynamically re-assigned to a set of processors within a particular cell of said MP computer system.

11. The method of automatically tuning an MP computer system as set forth in claim 1, wherein said ISRs are dynamically re-assigned to a set of processors within a particular node of said MP computer system.

12. A system for automatically tuning a multiprocessor (MP) computer system operable to service a plurality of interrupt service routines (ISRs) associated therewith, said system comprising:
   means to assign said ISRs, upon initialization of said MP computer system, to a plurality of processors disposed in said MP computer system;

a monitor for measuring runtime statistics associated with executing an ISR by a processor to which said ISR is assigned; and an interrupt distributor operable to re-assign said ISRs to at least a portion of said processors based on dynamically computing a new interrupt distribution pattern, upon determining that said processors are imbalanced with respect to a condition relating to said runtime statistics.

13. The system for automatically tuning an MP computer system as set forth in claim 12, wherein said means to assign said ISRs upon initialization of said MP computer system is operable to assign said ISRs in a round robin fashion.

14. The system for automatically tuning an MP computer system as set forth in claim 12, wherein said monitor comprises a counter operable to count the number of cycles each processor spends on each ISR assigned to it in a predetermined time period.

15. The system for automatically tuning an MP computer system as set forth in claim 12, further including means to reset said monitor upon re-assigning said ISRs based on said runtime statistics.

16. The system for automatically tuning an MP computer system as set forth in claim 12, further including means to reset said monitor upon determining that said processors are in substantial balance with respect to said runtime statistics.

17. The system for automatically tuning an MP computer system as set forth in claim 12, wherein said interrupt distributor is operable to re-assign said ISRs in a select interrupt distribution pattern based on an optimization algorithm.

18. The system for automatically tuning an MP computer system as set forth in claim 12, wherein said interrupt distributor is operable to re-assign said ISRs to a set of processors within a defined partition of said MP computer system.

19. The system for automatically tuning an MP computer system as set forth in claim 18, wherein said defined partition comprises a virtual partition.

20. The system for automatically tuning an MP computer system as set forth in claim 12, wherein said MP computer system comprises a multi-cellular system and said interrupt distributor is operable to re-assign said ISRs to a set of processors within a particular cell of said MP computer system.

21. The system for automatically tuning an MP computer system as set forth in claim 12, wherein said MP computer system comprises a multi-nodal system and said interrupt distributor is operable to re-assign said ISRs to a set of processors within a particular node of said MP computer system.

22. A multiprocessor (MP) computer system, comprising:
a plurality of processors arranged in a plurality of defined domains, each domain having a subset of processors, memory and a plurality of interrupt sources, wherein each interrupt source is associated with a corresponding interrupt source routine (ISR);

means for assigning said ISRs, upon initialization of said MP computer system, to said subset of processors within said defined domain; and an interrupt distributor operable to re-assign said ISRs to at least a portion of said subset of processors based on dynamically computing a new interrupt distribution pattern upon determining that said subset of processors are imbalanced with respect to a particular statistic associated with executing said ISRs.

23. The MP computer system as set forth in claim 22, wherein said defined domain comprises a virtual partition.

24. The MP computer system as set forth in claim 22, wherein said defined domain comprises a hardware-based partition.

25. The MP computer system as set forth in claim 22, wherein said defined domain comprises a cell.

26. The MP computer system as set forth in claim 22, wherein each of said subset of processors is associated with a resettable counter and said particular statistic comprises the number of cycles spent by each processor on each ISR assigned to it in a predetermined time period.

27. The MP computer system as set forth in claim 22, wherein said interrupt sources comprise Input/Output (I/O) devices.

28. A computer program product for dynamically configuring interrupts within a multiprocessor (MP) computer system operable to service a plurality of interrupt service routines (ISRs), said computer program product including a computer usable medium with computer readable program code thereon, comprising:

operating system code for creating an operating system instance executable on a set of processors in said MP computer system;

program code which assigns, upon initialization of said MP computer system, said ISRs to said set of processors in a particular fashion; and program code for re-distributing said ISRs among a portion of said processors based dynamically computing a new interrupt distribution pattern, upon determining that cycle times associated with executing said ISRs by said processors are imbalanced.

29. The computer program product as set forth in claim 28, further including program code for monitoring said cycle times.

30. The computer program product as set forth in claim 28, wherein said program code for re-distributing said ISRs among a portion of said processors includes program code for executing a dynamic programming method to determine an optimal distribution of said interrupts.

31. The computer program product as set forth in claim 28, wherein said operating system code comprises a Unix-based operating system.

* * * * *

UNITED STATES PATENT AND TRADEMARK OFFICE
CERTIFICATE OF CORRECTION

| | | |
|---|---|---|
| PATENT NO. | : 7,028,302 B2 | Page 1 of 1 |
| APPLICATION NO. | : 10/131669 | |
| DATED | : April 11, 2006 | |
| INVENTOR(S) | : Chris J. Kiick | |

It is certified that error appears in the above-identified patent and that said Letters Patent is hereby corrected as shown below:

In column 4, line 14, delete "TSR" and insert -- ISR --, therefor.

In column 5, line 29, delete "TSR" and insert -- ISR --, therefor.

In column 7, line 29, after "Moreover," delete "L".

In column 10, line 41, in Claim 28, after "based" insert -- on --.

Signed and Sealed this

Twenty-eighth Day of July, 2009

JOHN DOLL
*Acting Director of the United States Patent and Trademark Office*